G. WENZELMANN.
FERTILIZER SPREADER.
APPLICATION FILED APR. 23, 1918.

1,281,449.

Patented Oct. 15, 1918.
2 SHEETS—SHEET 1.

WITNESSES
Rosa M. Wenzelmann
O. J. Coolton

INVENTOR
Gustave Wenzelmann

G. WENZELMANN.
FERTILIZER SPREADER.
APPLICATION FILED APR. 23, 1918.
1,281,449.
Patented Oct. 15, 1918.
2 SHEETS—SHEET 2.
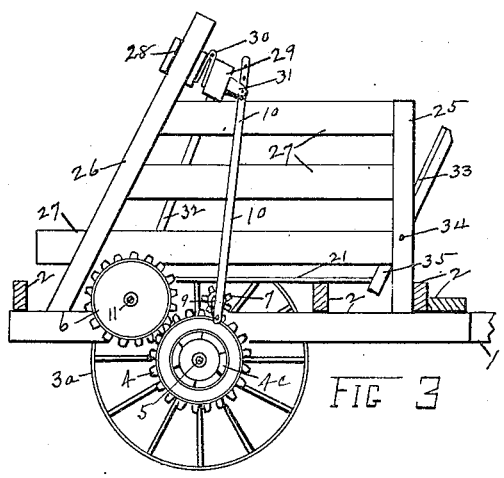
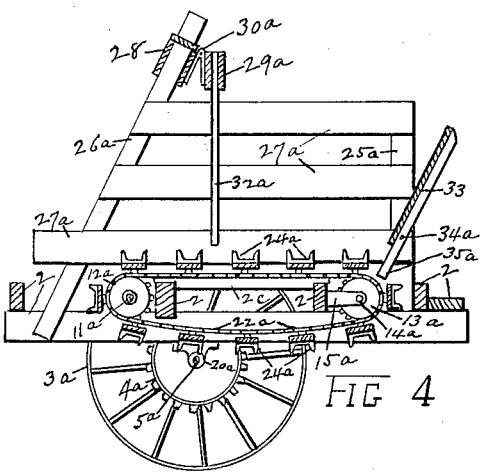
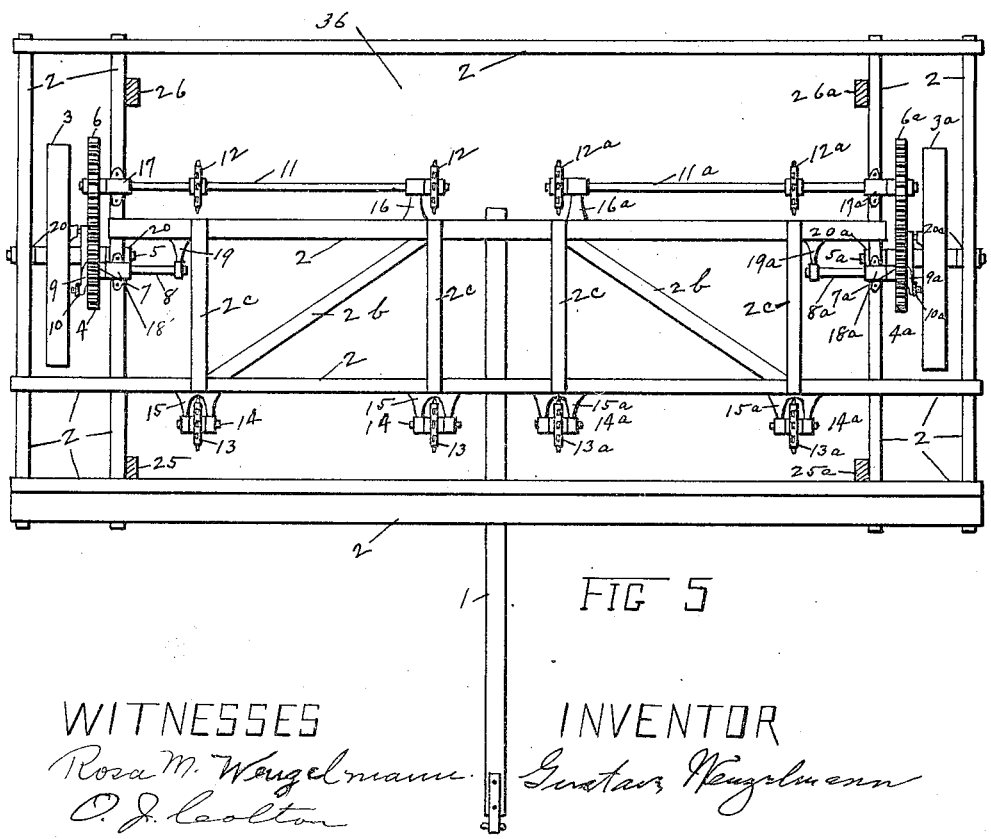

UNITED STATES PATENT OFFICE.

GUSTAVE WENZELMANN, OF GALESBURG, ILLINOIS.

FERTILIZER-SPREADER.

1,281,449.     Specification of Letters Patent.     Patented Oct. 15, 1918.

Application filed April 23, 1918. Serial No. 230,276.

*To all whom it may concern:*

Be it known that I, GUSTAVE WENZELMANN, residing at Galesburg, in the county of Knox and State of Illinois, have invented a new and useful Improvement in Fertilizer-Spreaders, of which the following is a specification.

My invention relates to machines for distributing or spreading fertilizing mulches and is especially adapted to handling straw which it is desired to spread as evenly as possible on tillable ground, particularly on ground where fall sowing has been done. One object in such spreading is to protect the crop through the winter.

The main objects of this invention are; to provide distributing means that will operate with the least possible power expenditure, the power applied being used with a minimum of friction and other wastage, and to provide effective means for controlling the amount of material discharged.

The general form of the device used is a trailer mounted on two wheels and adapted to be drawn behind a wagon on which the material to be distributed is loaded, and my invention consists of the various improvements hereinafter described in detail.

Figure 1:
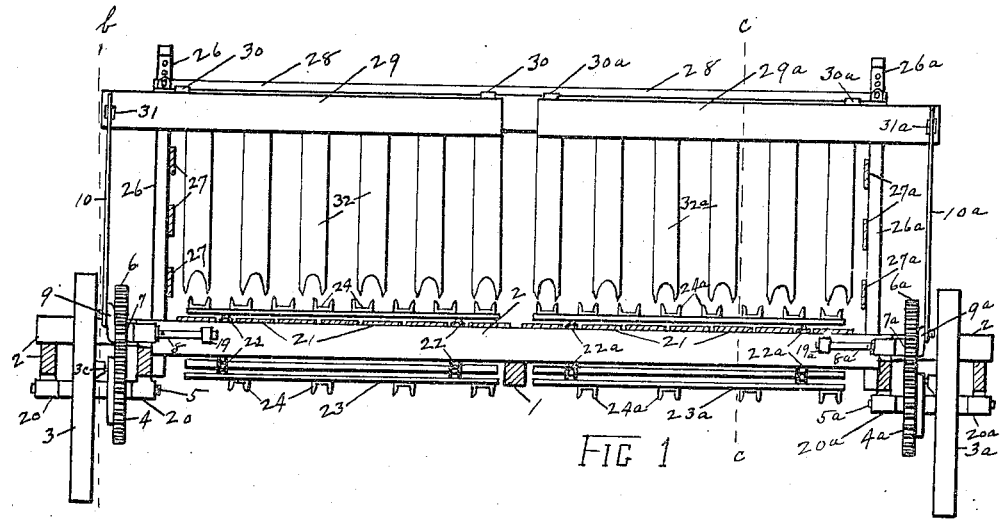
Figure 2:
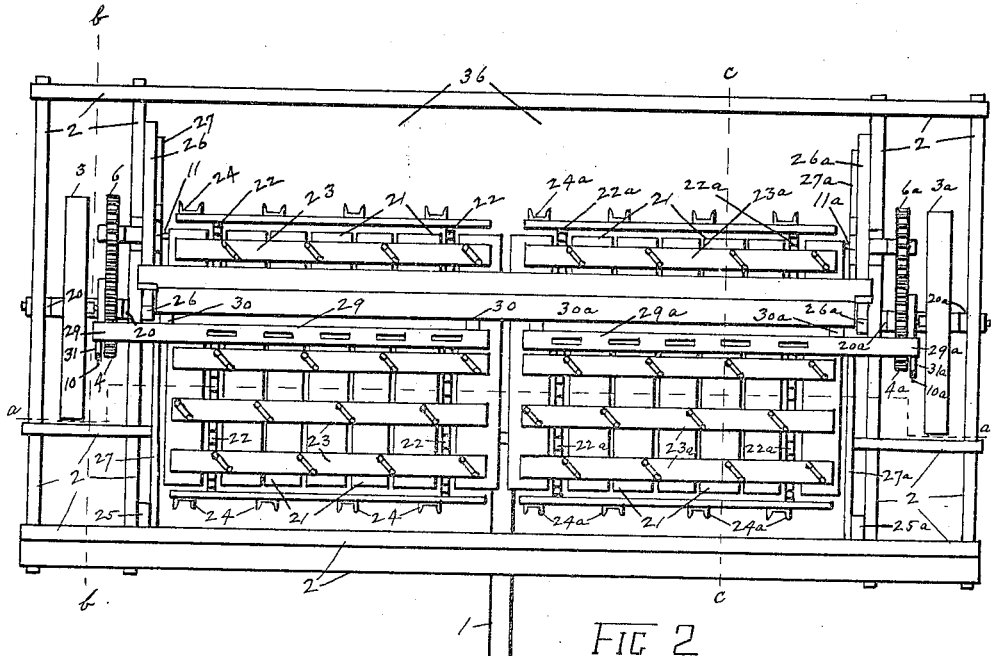

In order to illustrate the whole matter one method of applying my invention is shown in the accompanying drawings, in which Figure 1 shows a front view of a machine embodying my improvements, part of the frame being cut away to permit a more complete view of the working elements, the line of section being shown in Fig. 2 at *a—a*. Fig. 2 is a general top view of the entire machine except that the front board or apron is omitted. Fig. 3 is a sectional view on line *b—b*, and Fig. 4 is a sectional view on the line *c—c* of Figs. 1 and 2. And Fig. 5 is a plan view of the frame, wheels and working parts below the floor of the machine before assembling the feeding and distributing mechanism.

The reference characters used in the drawings uniformly indicate the same elements or parts of the machine in all drawings where the same are shown. 1 is a short tongue or handle having its outer end provided with a ring, a hook or other means of attachment to the rear part of the wagon, behind which the machine is to be drawn. 2 indicates the entire main frame of the machine the parts $2^c$ being so placed as to form supports and tracks for the carrier belts later described, and parts $2^b$ being braces to prevent racking of the frame. 3 and $3^a$ are traction wheels supporting frame 2 and supplying power to operate the working parts. It should be noted that 3 is the right hand wheel of the machine, shown at the left side of the drawings, and that $3^a$ is the left hand wheel, shown at the right in the drawings. In like manner, the letter "*a*", when used with any number in the drawings, refers to a part or group of parts of the left hand side of the machine; the same number without "*a*" indicating the right hand parts or part. 4, $4^a$ are main gear wheels, rotatably mounted on the short axles 5, $5^a$ on which wheels 3, $3^a$ are also mounted. These axles 5, $5^a$ are attached to the under side of frame 2 and are held in place without being allowed to rotate by means of brackets 20, 20 and $20^a$, $20^a$.

6, $6^a$ are gear wheels meshing with main gears 4, $4^a$ and firmly mounted on drive shafts 11, $11^a$ in bearings 17, $17^a$ and brackets 16, $16^a$ attached to frame 2. Small pinions 7, $7^a$ also mesh with main gears 4, $4^a$ and are mounted on short shafts 8, $8^a$ carried in bearings 18, $18^a$ and brackets 19, $19^a$ attached to frame 2. Each of the pinions 7, $7^a$ is provided with a crank arm and crank pin 9, $9^a$, each of said arms being an integral part of the corresponding pinion casting. The lower ends of bars 10, $10^a$ are connected with and controlled by the crank pins on crank arms 9, $9^a$. Sprocket wheels in pairs 12, 12 and $12^a$, $12^a$ are firmly mounted on drive shafts 11, $11^a$ in line with belt tracks $2^c$, and idler sprockets in corresponding pairs 13, 13 and $13^a$, $13^a$ are rotatably mounted on pins 14, 14 and $14^a$, $14^a$ in brackets 15, 15 and $15^a$, $15^a$, suitably attached to main frame 2 and likewise in line with belt tracks $2^c$.

A floor 21 is laid on the central part of frame 2, the boards of same being spaced apart somewhat to allow fine material or water to drop through. Belt tracks $2^c$ remain uncovered in suitable spaces between the boards of this floor. Link belts, in pairs 22, 22 and $22^a$, $22^a$, are placed on their appropriate sprocket wheels as shown. These link belts are provided with suitable attachment links at regular intervals and to these are fastened slats 23, $23^a$, each slat being attached to both belts of its corresponding pair and at right angles thereto, said attachments being near the ends of the slats. Each series of slats 23 and 23ª is thus entirely distinct in connection and operation from the other series. On the outer surface of these slats are feed fingers 24, 24ª. Corner posts 25, 25ª are erected at the front of frame 2, and sloping posts 26, 26ª at the rear. Across these are fastened end boards 27, 27ª. Cross beam 28 connects the upper ends of posts 26, 26ª and is supported thereby, the height of said cross beam being capable of adjustment by means of a plurality of bolt holes provided for that purpose in posts 26, 26ª. Gate heads 29, 29ª, having downwardly projecting forked boards 32, 32ª, are suspended from cross bar 28 by means of hinges in pairs 30, 30 and 30ª, 30ª. The swinging or oscillation of these gate heads on their hinges is controlled by arms 31, 31ª, to which the upper ends of bars 10, 10ª (already mentioned) are suitably connected. Forked boards 32, 32ª are built into gate heads 29, 29ª and extend downward, the forked lower ends forming rows of rake teeth which do not quite reach fingers 24, 24ª on slats 23, 23ª. By adjustment of the height of cross arm 28, it is obvious that the space between fingers 24, 24ª and the forked ends of 32, 32ª can be increased or diminished as desired. Provision is also made, by means of a plurality of holes in the upper ends of connecting bars 10, 10ª, for the adjustment of their connection with controlling arms 31, 31ª to correspond with changes in the height of cross bar 28 and the parts attached to same. A front board or apron 33 is pivoted between posts 25, 25ª at the points 34, 34ª and parts 35, 35ª project downward from apron 33, normally resting against the end of a board of floor 21 as shown in Fig. 3 and holding apron 33 in a sloping position. This apron, together with end boards 27, 27ª and forked gate boards 32, 32ª attached to gate heads 29, 29ª, completes an inclosure or hopper, which remains open above to receive the material to be distributed.

It will be observed that the right hand parts as described are entirely separate and distinct from the corresponding parts on the left hand side and that the two parts of the machine have entirely independent sources of power, act entirely independently of each other and have no relation except that of being mounted upon opposite sides of a single frame 2, drawn by a single tongue 1, the traction wheels 3, 3ª coöperating in supporting frame 2, but each driving exclusively its own part of the distributing apparatus.

For convenience, the method of operation of the right hand side will be described, that of the left hand side being understood to be identical and approximately, but not regularly, synchronous. One wheel may travel faster than the other, as must be the case in driving over uneven ground or in swerving from a straight line.

This absolute separation of the operative functions of the two traction wheels is a distinguishing feature of my invention and is of vital importance because in other devices of this nature the operative action of both wheels is applied to the entire distributing mechanism, thereby throwing the entire load upon the one wheel that happens, for any reason, to turn faster than the other. This often results in stalling or clogging the mechanism or in causing the overburdened wheel to slip on the ground without turning. The ratchets commonly used in the wheels or gearing of such machines allow the faster moving wheel to take all the work of its slower mate but even then add somewhat to the load thrown upon the doubly-burdened wheel. This power wasting defect is entirely overcome by the division and separation of power requirements and application which I have devised. Each wheel has its own load and is in no way hindered or burdened by any tardiness of the other. The result is greater efficiency, less strain on the working parts.

To proceed with the method of operation, traction wheel 3 and main gear 4 mounted on axle 5 are provided with ratchet or other means of engaging or disengaging each other. The means shown in the drawings consist of ratchet teeth on the outer side of gear 4 as shown at 4ᶜ, adapted to be engaged by a spring bolt 3ᶜ arranged to slide in keepers on the hub of wheel 3 and normally projecting from same in the path of ratchet teeth 4ᶜ, being allowed to spring back without turning gear 4 in case of backing the machine. Provision is also made for drawing back and retaining said spring bolt to throw wheel 3 out of engagement with gear 4 when it is desired to move the machine and not operate the parts. But, as this is a distinct invention not necessarily a part of my improvement in straw spreaders, it is not shown in greater detail but will be reserved for future description and claim in an application to be filed later. Any of the common and well-known ratchet devices may be used for the purpose stated.

Main gear 4, when driven by wheel 3, causes gear 6 to revolve thereby driving shaft 11 and sprockets 12, 12. These in turn, pulling on link belts 22, 22, cause slats 23 to travel over floor 21 toward the rear of the machine, returning underneath floor 21 and over sprockets 13, 13 for successive trips rearward over floor 21.

At the same time main gear 4 causes pinion 7 and its shaft 8 to revolve. Crank 9 revolving with pinion 7 and acting through connecting bar 10 and controlling arm 31 produces an oscillating movement of gate head 29 and gate forks 32, the limits of said movement being shown by the positions of 32, 32ª in Figs. 3 and 4 respectively.

It is apparent that the discharging of material carried by slats 23 in their rearward motion is limited by gate 29 with forked projections 32. What can not pass is pushed or raked back by the oscillation of gate forks 32 and is thus prevented from clogging the machine by accumulating at the rear. If too much or too little is discharged, it is only necessary to adjust the distance between teeth 24 and the lower ends of gate forks 32 in the manner already explained.

The means of producing oscillating motion of the rear gate through crank arm 9 on pinion 7 by acting through connecting bar 10 upon controlling arm 31, is a distinctive feature of my invention being much simpler and more effective than any I have seen used for a similar purpose.

The parts and relations of parts in my improved spreader having been described, its method of operation will be readily understood. A wagon, preferably having a hay rack of the ordinary form, is loaded with straw and the spreader is drawn behind it being suitably attached thereto.

The operator, riding on top of the moving load, pitches the straw into the open hopper of the machine, keeping both ends about equally supplied. The straw thrown from the load falls upon the moving slats 23 with fingers 24, (the right hand side still being used to illustrate the action of both), and is carried rearward. Part of the straw passes under gate forks 32 and is discharged through open space 36 of frame 2, falling or being thrown from slats 23 as they pass around sprockets 12, 12. The excess of straw not permitted to pass out under gate forks 32 is raked back by the oscillating motion of said forks as explained above and continues to be acted upon by a succession of slats 23 which keep on discharging an approximately regular quantity of material as long as the supply is maintained.

I claim as new and desire to secure by Letters Patent the following, to wit:

1. In a fertilizer spreader, the combination of a plurality of supporting traction wheels and axles, a main frame, a hopper, slats provided with feed fingers traversing the floor of said hopper rearwardly, said slats being arranged in a plurality of series, each series mounted on and drawn by two link belts; and a plurality of oscillating, discharge-regulating gates, one above each series of slats.

2. In a fertilizer spreader, the combination of a plurality of suporting traction wheels and axles, a main frame, a hopper; slats provided with feed fingers traversing the floor of said hopper rearwardly, said slats being arranged in a plurality of series, each series mounted on and drawn by two link belts; and a plurality of oscillating, discharge-regulating gates, one above each series of slats, each of said gates with its corresponding series of slats being independently and exclusively driven from one of said supporting traction wheels.

3. In a fertilizer spreader, the combination of a main frame, two supporting traction wheels, a hopper, twin means adapted to discharge the contents of said hopper, corresponding twin means adapted to regulate the rate of said discharge; and means whereby each of said discharging means together with its corresponding discharge-regulating means is independently and exclusively driven from one of said supporting traction wheels.

4. In a fertilizer spreader, the combination of a main frame, two supporting wheels, a receiving hopper, rearward moving means traversing the floor of said hopper adapted to discharge the contents thereof, and an oscillating gate adapted to agitate the material in said hopper and to regulate and equalize the rate of said discharge; said discharge-regulating means consisting of a swinging gate, a controlling arm on said gate and a connecting bar with its upper end hinged to said controlling arm and its lower end mounted on and driven by a crank pin in a crank arm attached to a pinion meshing with and caused to revolve by a gear wheel driven from one of the said supporting wheels.

5. In a fertilizer spreader, the combination of a main frame, two supporting traction wheels, a receiving hopper, rearward moving means in twin series traversing the floor of said hopper and adapted to discharge the contents thereof, and twin oscillating gates adapted to agitate the material placed in said hopper and to regulate and equalize the rate of said discharge, each of said gates coöperating with one series of the discharging means exclusively.

6. In a fertilizer spreader, the combination of a main frame, two supporting traction wheels, a receiving hopper, rearward moving means in twin series traversing the floor of said hopper and adapted to discharge the contents thereof, and twin oscillating gates adapted to agitate the material placed in said hopper and to regulate and equalize the rate of said discharge; each of said gates coöperating with one series of the discharging means exclusively, and each discharging means together with its coöperating regulating means being driven independently and exclusively from one of the supporting traction wheels.

7. In a fertilizer spreader, the combination of a plurality of supporting traction wheels and axles, a main frame, a hopper, slats provided with feed fingers traversing the floor of said hopper rearwardly, said slats being arranged in a plurality of series, each series mounted on and drawn by two link belts; and a plurality of oscillating, discharge-regulating gates, one above each series of slats, each of said gates with its corresponding series of slats being independently and exclusively driven from one of said supporting traction wheels; together with means for causing and controlling the oscillation of said gates, said means consisting of a controlling arm on each gate head, a bar connecting said arm with the crank pin of a crank attached to a pinion which meshes with a gear wheel driven by the corresponding supporting traction wheel.

In testimony whereof I have hereunto set my hand, in the presence of two witnesses, this 20 day of April, A. D. 1918.

GUSTAVE WENZELMANN.

Witnesses:
O. J. COLTON,
WALTER L. EKLUND.

Copies of this patent may be obtained for five cents each, by addressing the "Commissioner of Patents, Washington, D. C."